(12) United States Patent
Ikeda et al.

(10) Patent No.: US 9,539,971 B2
(45) Date of Patent: Jan. 10, 2017

(54) COLLISION DETECTION APPARATUS AND COLLISION DETECTION METHOD

(71) Applicant: Fuji Jukogyo Kabushiki Kaisha, Tokyo (JP)

(72) Inventors: Satoshi Ikeda, Tokyo (JP); Yuya Mukainakano, Tokyo (JP); Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/460,195

(22) Filed: Aug. 14, 2014

(65) Prior Publication Data
US 2015/0057893 A1 Feb. 26, 2015

(30) Foreign Application Priority Data

Aug. 23, 2013 (JP) ................................ 2013-173443

(51) Int. Cl.
| | |
|---|---|
| B60R 21/0136 | (2006.01) |
| B60R 19/03 | (2006.01) |
| B60R 19/34 | (2006.01) |
| B60R 19/48 | (2006.01) |

(52) U.S. Cl.
CPC ........... *B60R 21/0136* (2013.01); *B60R 19/03* (2013.01); *B60R 19/34* (2013.01); *B60R 19/483* (2013.01)

(58) Field of Classification Search
CPC .. B60R 21/0132; B60R 21/213; B60R 21/206; B60R 21/0136; B60R 19/03; B60R 19/34; B60R 19/483
See application file for complete search history.

(56) References Cited

U.S. PATENT DOCUMENTS

| | | | |
|---|---|---|---|
| 2004/0055805 A1 | 3/2004 | Lich et al. | |
| 2007/0235996 A1* | 10/2007 | Huh | B60R 21/0136 280/735 |
| 2008/0272580 A1* | 11/2008 | Breed | 280/735 |

(Continued)

FOREIGN PATENT DOCUMENTS

| | | |
|---|---|---|
| CN | 1469129 A | 1/2004 |
| JP | 2008-137606 A | 6/2008 |

OTHER PUBLICATIONS

Chinese Office Action in Chinese Application No. 201410406352 dated Aug. 4, 2016 with an English translation thereof.

*Primary Examiner* — Basil T Jos
(74) *Attorney, Agent, or Firm* — McGinn IP Law Group, PLLC.

(57) ABSTRACT

A collision detection apparatus includes: an energy absorption member that possesses conductivity and absorbs impact energy by being crushed in a front-rear direction; two contact members that possess conductivity and are respectively disposed in contact with front and rear end surfaces of the energy absorption member in order to press and crush the energy absorption member in the front-rear direction; a electric resistance detector that is electrically connected to both of the two contact members in order to detect variation in an electric resistance value accompanying crushing of the energy absorption member; and a displacement calculator that calculates a displacement amount of the energy absorption member in the front-rear direction on the basis of the variation in the electric resistance value detected by the electric resistance detector.

20 Claims, 4 Drawing Sheets

(56) References Cited

U.S. PATENT DOCUMENTS

2010/0324787 A1* 12/2010 Kaerner ............. B60R 21/0132
 701/45
2013/0193699 A1* 8/2013 Zannier .................. F16F 7/121
 293/133

* cited by examiner

COLLISION DETECTION APPARATUS AND COLLISION DETECTION METHOD

CROSS-REFERENCE TO RELATED APPLICATIONS

The present application claims priority from Japanese Patent Application No. 2013-173443 filed on Aug. 23, 2013, the entire contents of which are hereby incorporated by reference.

BACKGROUND

1. Technical Field

The present invention relates to a collision detection apparatus installed in an automobile to detect a collision with an external object, and a collision detection method.

2. Related Art

A conventional collision detection apparatus is installed in an automobile to detect a collision between the automobile and an external object. This type of collision detection apparatus typically detects an acceleration using an acceleration sensor. Depending on characteristics of employed materials, however, a collision may be detected more precisely by detecting a crushing amount of an object that receives a collision force rather than the acceleration. In a structure described in Japanese Unexamined Patent Application Publication No. 2008-137606, for example, a deformation amount (a crushing amount) of a crash box that absorbs energy generated during a collision is detected using an eddy current type displacement sensor, and an inflation operation of an airbag for protecting a passenger is controlled on the basis of a detection result.

However, an eddy current type displacement sensor typically has a short detection range of approximately 0 to 5 mm, and since the crash box has a length of approximately 150 mm, the crushing amount of the crash box cannot be detected over the entire length thereof. As a result, a condition for activating the airbag is limited to this short detection range, and therefore detailed condition setting cannot be performed over the entire length range of the crash box.

SUMMARY OF THE INVENTION

The present invention has been designed in consideration of the problem described above, and an object thereof is to provide a collision detection apparatus and a collision detection method with which a crushing amount of a crash box can be detected over an entire length thereof.

A first aspect of the present invention provides a collision detection apparatus installed in a vehicle to detect a collision between the vehicle and an external object, including:

an energy absorption member (a crash box) that possesses conductivity and absorbs impact energy by being crushed in a predetermined crushing direction;

two contact members that possess conductivity and are disposed in contact with respective end surfaces of the energy absorption member in the crushing direction in order to press and crush the energy absorption member in the crushing direction;

an electric resistance detector that is electrically connected to both of the two contact members in order to detect variation in an electric resistance value accompanying crushing of the energy absorption member; and a displacement calculator that calculates a displacement amount of the energy absorption member in the crushing direction on the basis of the variation in the electric resistance value detected by the electric resistance detector.

The collision detection apparatus may further include a determination unit that determines whether or not to activate an airbag for protecting a passenger of the vehicle on the basis of the displacement amount of the energy absorption member, calculated by the displacement calculator.

The collision detection apparatus may further includes:

a load calculator that calculates a load value acting on the energy absorption member on the basis of the displacement amount of the energy absorption member, calculated by the displacement calculator;

an impact acceleration calculator that calculates an impact acceleration acting on the energy absorption member on the basis of the load value calculated by the load calculator; and a determination unit that determines whether or not to activate an airbag for protecting a passenger of the vehicle on the basis of the impact acceleration calculated by the impact acceleration calculator.

Load-displacement characteristic data indicating a relationship between the load value and the displacement amount of the energy absorption member may be stored in advance, and the load calculator may calculate the load value on the basis of the load-displacement characteristic data.

Displacement-electric resistance characteristic data indicating a relationship between the displacement amount and the electric resistance value of the energy absorption member may be stored in advance, and the displacement calculator may calculate the displacement amount on the basis of the displacement-electric resistance characteristic data.

The energy absorption member may be made of a composite material containing conductive fiber.

Another aspect of the present invention provides a collision detection method employed in a collision detection apparatus installed in a vehicle in order to detect a collision between the vehicle and an external object, the collision detection apparatus including:

an energy absorption member that possesses conductivity and absorbs impact energy by being crushed in a predetermined crushing direction;

two contact members that possess conductivity and are disposed in contact with respective end surfaces of the energy absorption member in the crushing direction in order to press and crush the energy absorption member in the crushing direction; and an electric resistance detector that is electrically connected to both of the two contact members, the collision detection method including:

an electric resistance detection step in which variation in an electric resistance value accompanying crushing of the energy absorption member is detected by the electric resistance detector; and a displacement calculation step in which a displacement amount of the energy absorption member in the crushing direction is calculated on the basis of the variation in the electric resistance value detected in the electric resistance detection step.

The collision detection method may further includes a determination step of determining whether or not to activate an airbag for protecting a passenger of the vehicle on the basis of the displacement amount of the energy absorption member, calculated in the displacement calculation step.

The collision detection method may further includes:

a load calculation step of calculating a load value acting on the energy absorption member on the basis of the displacement amount of the energy absorption member, calculated in the displacement calculation step;

an impact acceleration calculation step of calculating an impact acceleration acting on the energy absorption member on the basis of the load value calculated in the load calculation step; and a determination step of determining whether or not to activate an airbag for protecting a passenger of the vehicle on the basis of the impact acceleration calculated in the impact acceleration calculation step.

In the load calculation step, the load value may be calculated on the basis of load-displacement characteristic data indicating a relationship between the load value and the displacement amount of the energy absorption member, which are stored in the collision detection apparatus in advance.

In the displacement calculation step, the displacement amount may be calculated on the basis of displacement-electric resistance characteristic data indicating a relationship between the displacement amount and the electric resistance value of the energy absorption member, which are stored in the collision detection apparatus in advance.

The energy absorption member may be made of a composite material containing conductive fiber.

DETAILED DESCRIPTION

An implementation of the present invention will be described below with reference to the drawings.

[Configuration]

Figure 1:
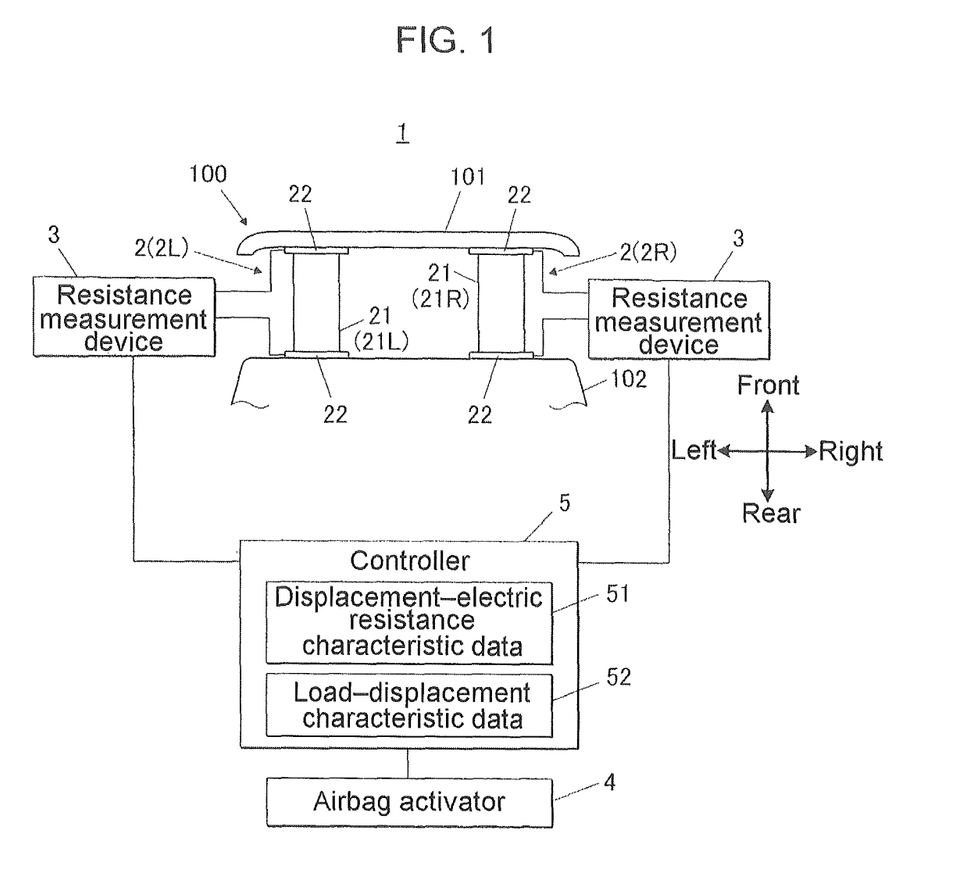
FIG. 1 is a schematic view illustrating a configuration of a collision detection apparatus according to an implementation.

FIG. 1 is a schematic view illustrating a configuration of a collision detection apparatus 1 according to this implementation.

As illustrated in the drawing, the collision detection apparatus 1 is installed in a vehicle (an automobile) 100 in order to detect a collision between the vehicle 100 and an external object and inflate an airbag for protecting a passenger. More specifically, the collision detection apparatus 1 includes two shock absorbers 2, two resistance measurement devices 3, an airbag activator 4, and a controller 5.

Note that in the following description, it is assumed, in the absence of specific description to the contrary, that the terms "front", "rear", "left", and "right" indicate directions seen from the vehicle 100 in which the collision detection apparatus 1 is installed.

The two shock absorbers 2 are arranged side by side in a left-right direction (a vehicle width direction) between a bumper beam 101 and a front frame 102 of the vehicle 100 in order to absorb an impact from a vehicle front. Each shock absorber 2 includes a crash box 21 and two lid members 22 disposed respectively in contact with front and rear end surfaces of the crash box 21.

The crash box 21 corresponds to an energy absorption member according to the present invention, and absorbs impact energy of an impact load received by the front side lid member 22 by being pressed by the lid member 22 from the front so as to be crushed in a front-rear direction. The crash box 21 is formed in a cylindrical shape and disposed to extend in the front-rear direction. Further, the crash box 21 is formed from fiber reinforced plastic (FRP), which is a composite material in which resin is reinforced by fiber, and more specifically from FRP including conductive fiber (carbon fiber or metal fiber, for example). Hence, the crash box 21 is conductive.

The two lid members 22 are formed from metal in a substantially flat plate shape and disposed orthogonally to the front-rear direction so as to contact the front and rear end surfaces of the crash box 21, respectively. The two lid members 22 serve as parts of the shock absorber 2 that are attached to the vehicle 100. Accordingly, the front side lid member 22 is attached to a rear surface of the bumper beam 101, and the rear side lid member 22 is attached to a front surface of the body frame 102. Hence, when an impact load is exerted on the shock absorber 2 from the front via the bumper beam 101, the front side lid member 22 presses the crash box 21 while the rear side lid member 22 supports the crash box 21, and as a result, the crash box 21 is pressed and crushed in the front-rear direction.

The two resistance measurement devices 3 are provided in accordance with the two shock absorbers 2 in order to measure individual electric resistance values of the two shock absorbers 2. More specifically, each resistance measurement device 3 is electrically connected to both of the two lid members 22 of the corresponding shock absorber 2. The resistance measurement device 3 is thus capable of detecting variation in the electric resistance value of the shock absorber 2 (in other words, the crash box 21 itself) occurring when the crash box 21 is crushed.

The airbag activator 4 includes an airbag, not illustrated in the drawings, for protecting a passenger of the vehicle 100, and inflates (expands) the airbag on the basis of a control signal from the controller 5.

The controller 5 is electrically connected to the two resistance measurement devices 3 and the airbag activator 4, and performs operational control on the airbag activator 4 on the basis of the electric resistance values measured by the two resistance measurement devices 3, as will be described below. Furthermore, the controller 5 stores displacement-electric resistance characteristic data 51 and load-displacement characteristic data 52 as characteristic data relating to the shock absorber 2.

Of these data, the displacement-electric resistance characteristic data 51 are data indicating a relationship between the electric resistance value of the shock absorber 2 (the crash box 21) and a displacement amount (a crushing amount) of the crash box 21 in the front-rear direction.

Figure 2:
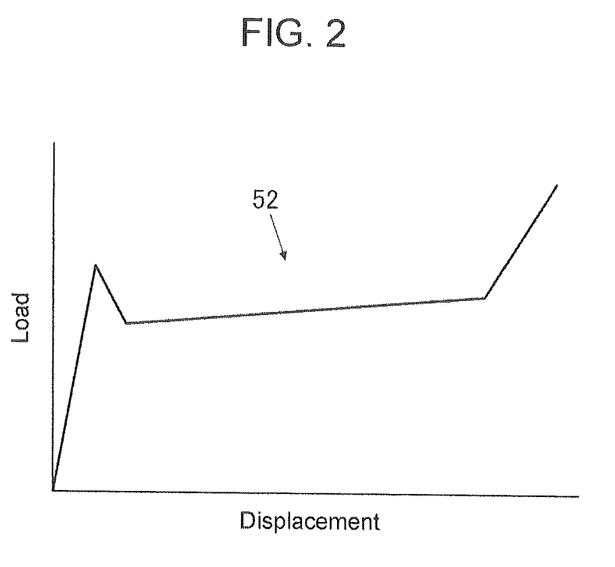
FIG. 2 is a graph illustrating an example of load-displacement characteristic data according to this implementation.

The load-displacement characteristic data 52, meanwhile, as illustrated in FIG. 2, are data indicating a relationship between the displacement amount (the crushing amount) of the crash box 21 in the front-rear direction and a load value acting on the crash box 21 (the shock absorber 2) at that time in the front-rear direction.

The displacement-electric resistance characteristic data 51 and the load-displacement characteristic data 52 are obtained in advance and stored in the controller 5. Note, however, that the displacement-electric resistance characteristic data 51 and the load-displacement characteristic data 52 may be stored in a storage unit, not illustrated in the drawings, and read from the storage unit by the controller 5 when required.

[Operation]

Next, an operation of the collision detection apparatus 1 will be described with reference to FIGS. 3 and 4.

Figure 3:
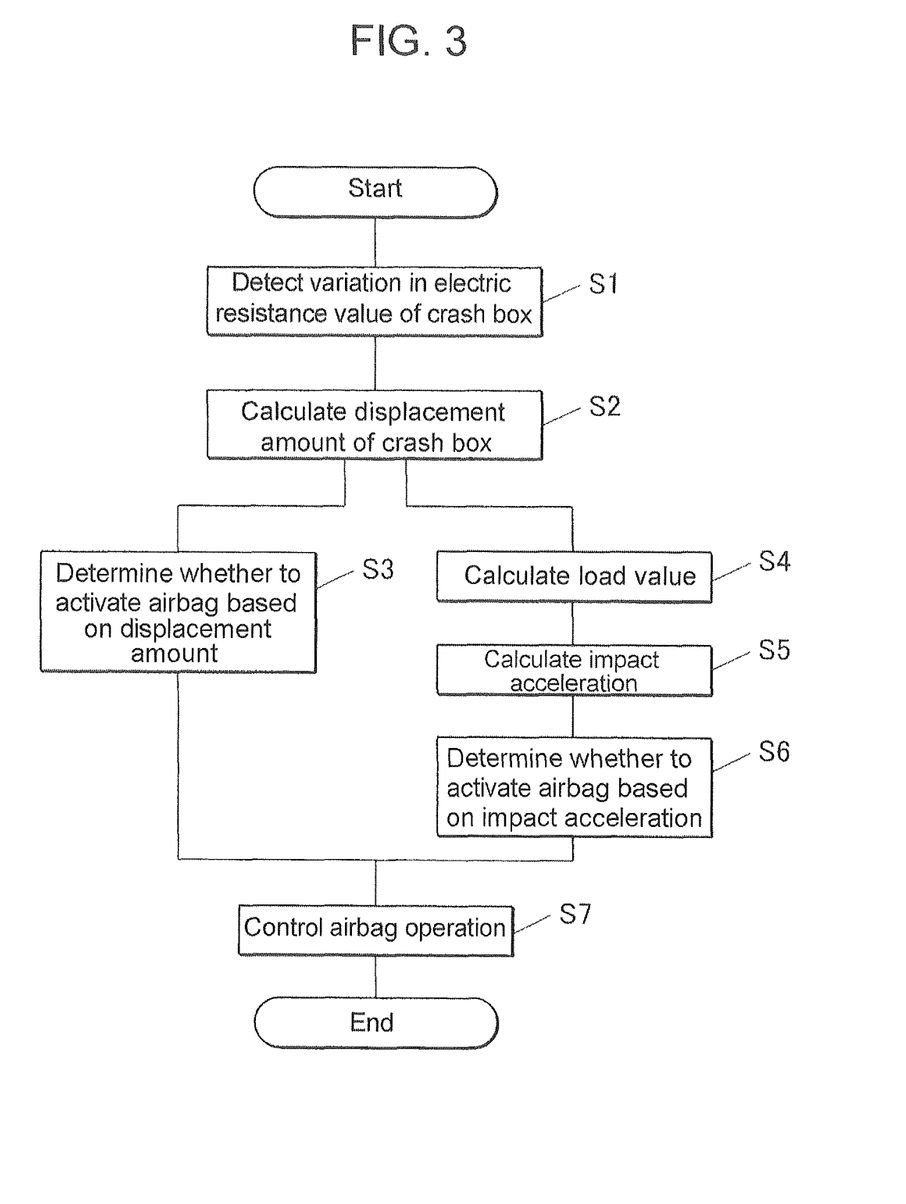
FIG. 3 is a flowchart illustrating an operation of the collision detection apparatus according to this implementation.
Figure 4A:
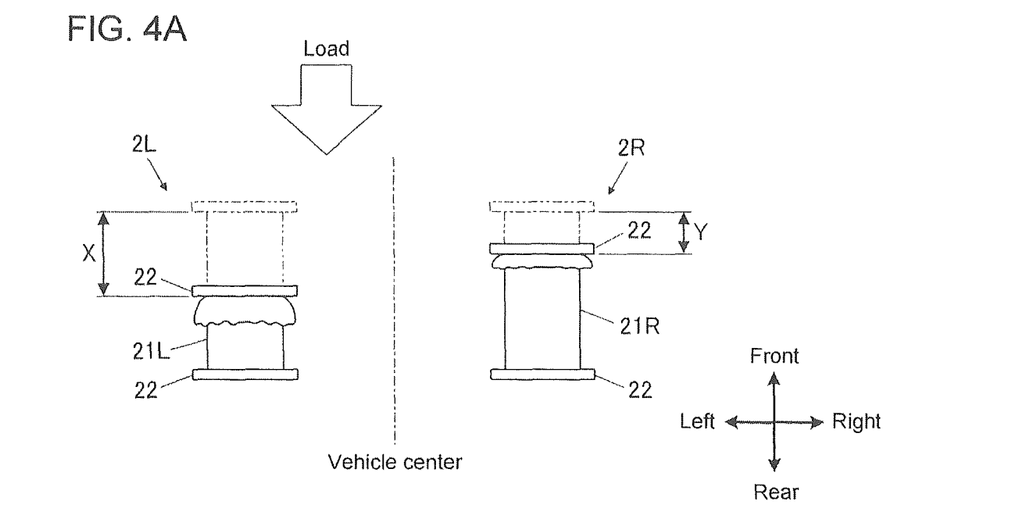
FIGS. 4A-4B are views illustrating energy absorption by two shock absorbers upon reception of an impact load, according to this implementation.
Figure 4B:
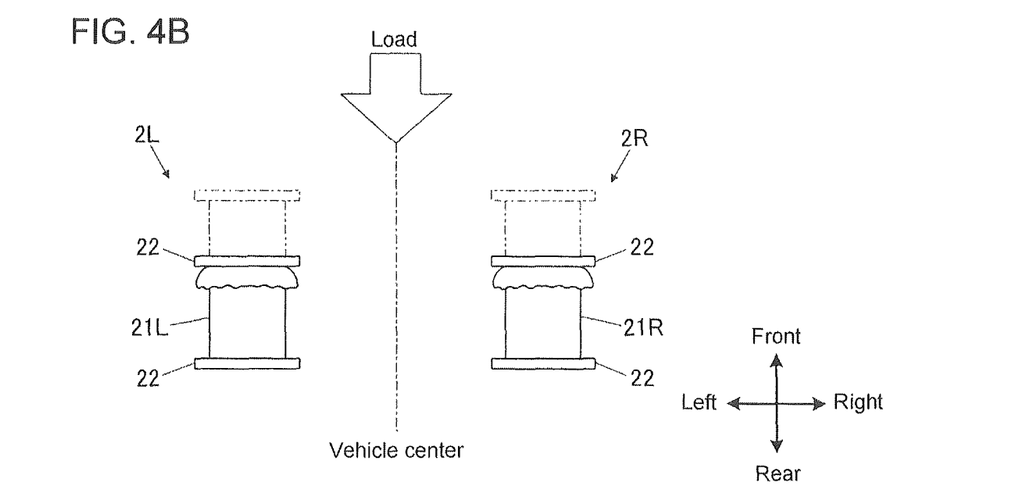

FIG. 3 is a flowchart illustrating an operation of the collision detection apparatus 1, and FIG. 4 is a view illustrating energy absorption by two shock absorbers 2 (in other words, the manner in which the two crash boxes 21 are crushed) upon reception of an impact load.

Note that in the following description, the two shock absorbers 2 are identified by attaching "L" and "R" to the reference symbols of members disposed on the left side and the right side of the vehicle 100, respectively.

When the vehicle 100 installed with the collision detection apparatus 1 collides with an object in front or the like, for example, an impact load from the front is exerted on the two shock absorbers 2 via the bumper beam 101 such that the respective crash boxes 21 are pressed and crushed in the front-rear direction.

When the crash box 21 is crushed (shortened) in the front-rear direction, a conduction path shortens, leading to a reduction in the electric resistance value of the crash box 21. At this time, as illustrated in FIG. 3, the resistance measurement device 3 detects the variation in the electric resistance value of the corresponding crash box 21 (step S1).

Next, the controller 5 calculates the displacement amount (the crushing amount) of the crush box 21 in the front-rear direction on the basis of the variation in the electric resistance value detected by the resistance measurement device 3 in step S1 (step S2). More specifically, the controller 5 calculates the displacement amount of the crash box 21 as a value corresponding to the variation in the electric resistance value, detected by the resistance measurement device 3, on the basis of the displacement-electric resistance characteristic data 51.

Next, the controller 5 determines whether or not to operate the airbag activator 4 on the basis of the displacement amount of the crash box 21, calculated in step S2 (step S3). More specifically, the controller 5 determines whether or not the displacement amount of the crash box 21 exceeds a predetermined threshold.

Further, the controller 5 calculates the load value acting on the crash box 21 on the basis of the displacement amount of the crash box 21, calculated in step S2 (step S4). More specifically, the controller 5 calculates the load value acting on the crash box 21 as a value corresponding to the displacement amount of the crash box 21 on the basis of the load-displacement characteristic data 52 (see FIG. 2).

Next, the controller 5 calculates an impact acceleration acting on the crash box 21 on the basis of the load value acting on the crash box 21, calculated in step S4 (step S5). In step S5, the controller 5 calculates the impact accelerations acting respectively on the left and right crash boxes 21L, 21R on the basis of the respective displacement amounts and load values of the left and right crash boxes 21L, 21R by dividing the respective load values by vehicle weight proportions corresponding to the left and right displacement amounts.

More specifically, as illustrated in FIG. 4A, when the displacement amount of the left side crash box 21L is set as X and the displacement amount of the right side crash box 21R is set as Y, the controller 5 calculates an impact acceleration $A_L$ in relation to the left side crash box 21L and an impact acceleration $A_R$ in relation to the right side crash box 21R using Equations (1) and (2), illustrated below.

$$A_L = F_L / [M \times \{X/(X+Y)\}] \tag{1}$$

$$A_R = F_R / [M \times \{Y/(X+Y)\}] \tag{2}$$

Here, $F_L$ and $F_R$ are the load value acting on the left side crash box 21L and the load value acting on the right side crash box 21R, respectively, and M is the weight of the vehicle 100.

A case such as that illustrated above, in which the left and right crash boxes 21L, 21R are displaced by different amounts, occurs when the impact load is offset to either the left or the right from a center of the left-right direction of the vehicle 100 or the like, for example.

Note that when the impact load is exerted on the center of the left-right direction of the vehicle 100, as illustrated in FIG. 4B, such that the left and right crash boxes 21L, 21R are displaced by substantially identical amounts, the controller 5 may calculate the impact accelerations $A_L$, $A_R$ using simplifications of Equations (1) and (2), as illustrated below in Equations (3) and (4).

$$A_L = F_L / (M/2) \tag{3}$$

$$A_R = F_R / (M/2) \tag{4}$$

Next, as illustrated in FIG. 3, the controller 5 determines whether or not to operate the airbag activator 4 on the basis of the impact accelerations $A_L$, $A_R$ calculated in step S5 (step S6). More specifically, the controller 5 determines whether or not the impact accelerations $A_L$, $A_R$ exceed a predetermined threshold.

After determining that one of the displacement amounts of the two crash boxes 21 exceeds the predetermined threshold in step S3 or that one of the impact accelerations $A_L$, $A_R$ exceeds the predetermined threshold in step S6, the controller 5 operates the airbag activator 4 such that the airbag is inflated (step S7).

According to this implementation, as described above, the two conductive lid members 22 are disposed respectively in contact with the front and rear end surfaces of the conductive crash box 21, the variation in the electric resistance value accompanying crushing of the crash box 21 is detected by the resistance measurement device 3, which is electrically connected to both of the two lid members 22, and the displacement amount (the crushing amount) of the crash box 21 in the front-rear direction is calculated on the basis of the variation in the electric resistance value. Hence, the crushing amount of the crash box 21 is calculated using the electric resistance value, which varies in accordance with the crushing amount, and therefore the crushing amount of the crash box 21 can be detected over an entire length of the crash box 21 in the crushing direction (the front-rear direction).

Further, the crash box 21 itself exhibits a displacement sensing function, and therefore, in contrast to the related art, in which it is necessary to provide a dedicated displacement sensor, the collision detection apparatus 1 can be configured simply merely by providing the resistance measurement device 3 for each shock absorber 2.

Furthermore, the impact accelerations $A_L$, $A_R$ are calculated on the basis of the displacement amounts of the respective crash boxes 21, and the determination as to whether or not to operate the airbag activator 4 is made on the basis of the impact accelerations $A_L$, $A_R$. Hence, in contrast to the related art, in which the airbag is activated on the basis of the displacement amount of the crash box alone, even a light impact that is not accompanied by crushing of the crash box 21 can be detected reliably, whereupon the airbag can be activated.

Moreover, even in the case of a light impact, the impact can be detected with a favorable degree of sensitivity, and therefore the present invention can be applied favorably even to a crash box 21 having load-displacement characteristic data 52 (see FIG. 2) that exhibit a sharp initial rise. In other words, the present invention can be applied favorably to a crash box 21 that absorbs a large amount of energy.

[Modified Examples]

Note that implementations to which the present invention can be applied are not limited to the implementation described above, and therefore the implementation described above may be modified appropriately within a range that does not depart from the spirit of the present invention.

For example, in the above implementation, the determination as to whether or not to operate the airbag activator 4 is made on the basis of both the displacement amount of the crash box 21 and the impact acceleration, but the determination may be made on the basis of only one of the displacement amount and the impact acceleration.

Further, when calculating the impact acceleration, the impact acceleration may be calculated directly from the displacement amount of the crash box 21 (from temporal variation in the displacement amount) instead of calculating the load value.

Furthermore, the airbag is activated after determining that the displacement amount of the crash box 21 or the impact acceleration exceeds a predetermined threshold, but operations of a passenger protection apparatus other than the airbag, a braking apparatus, and so on, for example, may also be controlled.

Moreover, as long as the crash box 21 is conductive, the crash box 21 need not be made of FRP, and may be made of metal, for example, instead. Furthermore, the crash box 21 is not limited to a cylindrical shape, and may take the shape of a column, a prism, a pyramid, and so on, for example.

The invention claimed is:

1. A collision detection apparatus installed in a vehicle to detect a collision between the vehicle and an external object, comprising:
    an energy absorption member that possesses conductivity and absorbs impact energy by being crushed in a predetermined crushing direction;
    two contact members that possess conductivity and are disposed in contact with front and rear end surfaces in a direction of a vehicle length of the energy absorption member in the crushing direction in order to press and crush the energy absorption member in the crushing direction;
    an electric resistance detector that is electrically connected to both of the two contact members and that detects variation in an electric resistance value between the contact members accompanying crushing of the energy absorption member; and
    a displacement calculator that calculates a displacement amount of the energy absorption member between the contact members in the crushing direction on the basis of the variation in the electric resistance value detected by the electric resistance detector.

2. The collision detection apparatus according to claim 1, further comprising a determination unit that determines whether or not to activate an airbag for protecting a passenger of the vehicle on the basis of the displacement amount of the energy absorption member, calculated by the displacement calculator.

3. The collision detection apparatus according to claim 2, further comprising:
    a load calculator that calculates a load value acting on the energy absorption member on the basis of the displacement amount of the energy absorption member, calculated by the displacement calculator;
    an impact acceleration calculator that calculates an impact acceleration acting on the energy absorption member on the basis of the load value calculated by the load calculator; and
    a determination unit that determines whether or not to activate an airbag for protecting a passenger of the vehicle on the basis of the impact acceleration calculated by the impact acceleration calculator.

4. The collision detection apparatus according to claim 3, wherein load-displacement characteristic data indicating a relationship between the load value and the displacement amount of the energy absorption member are stored in advance, and
    the load calculator calculates the load value on the basis of the load-displacement characteristic data.

5. The collision detection apparatus according to claim 1, further comprising:
    a load calculator that calculates a load value acting on the energy absorption member on the basis of the displacement amount of the energy absorption member, calculated by the displacement calculator;
    an impact acceleration calculator that calculates an impact acceleration acting on the energy absorption member on the basis of the load value calculated by the load calculator; and
    a determination unit that determines whether or not to activate an airbag for protecting a passenger of the vehicle on the basis of the impact acceleration calculated by the impact acceleration calculator.

6. The collision detection apparatus according to claim 5, wherein load-displacement characteristic data indicating a relationship between the load value and the displacement amount of the energy absorption member are stored in advance, and
    the load calculator calculates the load value on the basis of the load-displacement characteristic data.

7. The collision detection apparatus according to claim 1, wherein displacement-electric resistance characteristic data indicating a relationship between the displacement amount and the electric resistance value of the energy absorption member are stored in advance, and
    the displacement calculator calculates the displacement amount on the basis of the displacement-electric resistance characteristic data.

8. The collision detection apparatus according to claim 1, wherein the energy absorption member comprises a composite material containing conductive fiber.

9. The collision detection apparatus according to claim 1, wherein a first contact member of the two contact members is disposed on a first side of a center point of the energy of the energy absorption member,
    wherein a second contact member of the two contact members is disposed on a second side of the center point of the energy of the energy absorption member.

10. The collision detection apparatus according to claim 9,
    wherein the first contact member of the two contact members is disposed at a first distance from the center point of the energy absorption member on the first side of the energy, and
    wherein the second contact member of the two contact members is disposed at a second distance from the center point of the energy absorption member on the second side of the energy, the second distance being equal to the first distance.

11. The collision detection apparatus according to claim 9, wherein the first contact member of the two contact members is disposed at a first distance from the center point of the energy absorption member on the first side of the energy, and wherein the second contact member of the two contact members is disposed at a second distance from the center point of the energy absorption member on the second side of the energy, the second distance being different than the first distance.

12. The collision detection apparatus according to claim 1, wherein the energy absorption member is disposed between a bumper beam and a front frame of the vehicle.

13. A collision detection method employed in a collision detection apparatus installed in a vehicle in order to detect a collision between the vehicle and an external object, the collision detection apparatus including:

an energy absorption member that possesses conductivity and absorbs impact energy by being crushed in a predetermined crushing direction;

two contact members that possess conductivity and are disposed in contact with front and rear end surfaces in a direction of a vehicle length of the energy absorption member in the crushing direction in order to press and crush the energy absorption member in the crushing direction; and an electric resistance detector that is electrically connected to both of the two contact members, the collision detection method comprising:

an electric resistance detection step in which variation in an electric resistance value between the contact members accompanying crushing of the energy absorption member is detected by the electric resistance detector; and a displacement calculation step in which a displacement amount of the energy absorption member between the contact members in the crushing direction is calculated on the basis of the variation in the electric resistance value detected in the electric resistance detection step.

14. The collision detection method according to claim 13, further comprising a determination step of determining whether or not to activate an airbag for protecting a passenger of the vehicle on the basis of the displacement amount of the energy absorption member, calculated in the displacement calculation step.

15. The collision detection method according to claim 14, further comprising:

a load calculation step of calculating a load value acting on the energy absorption member on the basis of the displacement amount of the energy absorption member, calculated in the displacement calculation step;

an impact acceleration calculation step of calculating an impact acceleration acting on the energy absorption member on the basis of the load value calculated in the load calculation step; and a determination step of determining whether or not to activate an airbag for protecting a passenger of the vehicle on the basis of the impact acceleration calculated in the impact acceleration calculation step.

16. The collision detection method according to claim 15, wherein, in the load calculation step, the load value is calculated on the basis of load-displacement characteristic data indicating a relationship between the load value and the displacement amount of the energy absorption member, which are stored in the collision detection apparatus in advance.

17. The collision detection method according to claim 13, further comprising:

a load calculation step of calculating a load value acting on the energy absorption member on the basis of the displacement amount of the energy absorption member, calculated in the displacement calculation step;

an impact acceleration calculation step of calculating an impact acceleration acting on the energy absorption member on the basis of the load value calculated in the load calculation step; and a determination step of determining whether or not to activate an airbag for protecting a passenger of the vehicle on the basis of the impact acceleration calculated in the impact acceleration calculation step.

18. The collision detection method according to claim 17, wherein, in the load calculation step, the load value is calculated on the basis of load-displacement characteristic data indicating a relationship between the load value and the displacement amount of the energy absorption member, which are stored in the collision detection apparatus in advance.

19. The collision detection method according to claim 13, wherein, in the displacement calculation step, the displacement amount is calculated on the basis of displacement-electric resistance characteristic data indicating a relationship between the displacement amount and the electric resistance value of the energy absorption member, which are stored in the collision detection apparatus in advance.

20. The collision detection method according to claim 13, wherein the energy absorption member comprises a composite material containing conductive fiber.

* * * * *